(12) United States Patent
Chong

(10) Patent No.: US 11,486,792 B2
(45) Date of Patent: Nov. 1, 2022

(54) TUNABLE LIGHT SOURCE FOR OPTICAL FIBER PROXIMITY AND TESTING

(71) Applicant: SANTEC CORPORATION, Aichi (JP)

(72) Inventor: Changho Chong, Los Altos, CA (US)

(73) Assignee: SANTEC CORPORATION, Komaki (JP)

( * ) Notice: Subject to any disclaimer, the term of this patent is extended or adjusted under 35 U.S.C. 154(b) by 48 days.

(21) Appl. No.: 16/893,968

(22) Filed: Jun. 5, 2020

(65) Prior Publication Data

US 2021/0381820 A1    Dec. 9, 2021

(51) Int. Cl.
*G01M 11/00* (2006.01)
*G01H 9/00* (2006.01)
*G01B 9/02015* (2022.01)
*G01M 11/08* (2006.01)

(52) U.S. Cl.
CPC ..... *G01M 11/3172* (2013.01); *G01B 9/02023* (2013.01); *G01H 9/004* (2013.01); *G01M 11/085* (2013.01)

(58) Field of Classification Search
CPC . G01B 11/27–11/2755; G01B 9/02023; G01B 11/272; G01B 9/02004; G01M 11/331; G01M 11/3127; G01M 11/3172; G01M 11/085; G01H 9/004
See application file for complete search history.

(56) References Cited

U.S. PATENT DOCUMENTS

| | | | |
|---|---|---|---|
| 10,838,047 B2 | 11/2020 | Chong | |
| 11,067,671 B2 | 7/2021 | Chong | |
| 11,067,816 B1 | 7/2021 | Vathys | |
| 11,391,841 B2 | 7/2022 | Bondy et al. | |
| 2003/0020903 A1* | 1/2003 | Healy | G02B 6/4216 356/138 |
| 2003/0080899 A1 | 5/2003 | Lee et al. | |
| 2003/0089778 A1 | 5/2003 | Tsikos et al. | |

(Continued)

FOREIGN PATENT DOCUMENTS

| | | |
|---|---|---|
| JP | 2016-502665 A | 1/2016 |
| JP | 2017-502315 A | 1/2017 |

(Continued)

OTHER PUBLICATIONS

International Search Report and Written Opinion for International Application No. PCT/US2021/019341 dated May 3, 2021, 10 pages.

(Continued)

*Primary Examiner* — Michael P LaPage
(74) *Attorney, Agent, or Firm* — Foley & Lardner LLP

(57) ABSTRACT

Systems and methods for alignment and testing of a photonic device include a light source, an interferometer, a detector, and a processing circuit. The processing circuit may generate control signal(s) for the light source to project a beam through the interferometer to a device under testing (DUT). The interferometer may receive an interference beam from an optical fiber of the DUT. The processing circuit may align optical fiber(s) for the DUT, determine one or more characteristics for the DUT, and so forth based on the interference beam and a reference beam generated by the interferometer.

18 Claims, 8 Drawing Sheets

(56) References Cited

U.S. PATENT DOCUMENTS

| | | | |
|---|---|---|---|
| 2003/0210389 A1* | 11/2003 | Matsumoto | G02B 6/4221 356/153 |
| 2004/0036886 A1* | 2/2004 | Motamedi | G01M 11/3109 356/477 |
| 2005/0030544 A1* | 2/2005 | VanWiggeren | G01M 11/331 356/450 |
| 2005/0088661 A1* | 4/2005 | Froggatt | G01M 11/331 356/479 |
| 2006/0114471 A1* | 6/2006 | Cyr | G01M 11/331 356/477 |
| 2007/0171367 A1 | 7/2007 | Sebastian et al. | |
| 2008/0063028 A1 | 3/2008 | Lekkas et al. | |
| 2009/0103100 A1* | 4/2009 | Froggatt | G01M 11/083 356/477 |
| 2011/0080561 A1 | 4/2011 | Hayashi et al. | |
| 2011/0205523 A1 | 8/2011 | Rezk et al. | |
| 2011/0273719 A1* | 11/2011 | Froggatt | G01B 9/02004 356/446 |
| 2015/0177380 A1 | 6/2015 | Satyan et al. | |
| 2016/0259038 A1 | 9/2016 | Retterath et al. | |
| 2016/0266005 A1* | 9/2016 | Bos | G01M 11/3127 |
| 2016/0343169 A1 | 11/2016 | Mullins et al. | |
| 2016/0356881 A1 | 12/2016 | Retterath et al. | |
| 2017/0009031 A1 | 1/2017 | Inokuchi et al. | |
| 2018/0172920 A1* | 6/2018 | Froggatt | G02B 6/3877 |
| 2018/0238675 A1 | 8/2018 | Wan | |
| 2019/0257927 A1 | 8/2019 | Yao | |
| 2019/0317194 A1 | 10/2019 | Chong | |
| 2019/0317199 A1 | 10/2019 | Chong | |
| 2020/0072941 A1 | 3/2020 | Jansen et al. | |
| 2020/0371239 A1 | 11/2020 | Rumala | |
| 2021/0157000 A1 | 5/2021 | Imaki | |
| 2021/0247497 A1 | 8/2021 | Li et al. | |
| 2021/0356359 A1* | 11/2021 | Cyr | G01M 11/337 |
| 2021/0405194 A1 | 12/2021 | Tsuchida | |

FOREIGN PATENT DOCUMENTS

| | | |
|---|---|---|
| WO | WO-2015/087564 A1 | 6/2015 |
| WO | WO-2017/054036 A1 | 4/2017 |
| WO | WO-2019/204301 A1 | 10/2019 |

OTHER PUBLICATIONS

Snyder, "Wide dynamic range optical power measurement using coherent heterodyne radiometry," Applied Optics, Nov. 1, 1988, vol. 27, No. 21, pp. 4465-4469.

Chan T. [et al.]: 2-Dimensional beamsteering using dispersive deflectors and wavelength tuning. In: Optics Express, vol. 16, No. 19, 2008, S. 14617-14628.

International Search Report on PCT/US2022/014505 dated May 11, 2022 (11 pages).

Koyama F. [et al.]: Beam Steering, Beam Shaping, and Intensity Modulation Based on VCSEL Photonics, in IEEE Journal of Selected Topics in Quantum Electronics, vol. 19, No. 4, Jul.-Aug. 2013, S. 1701510-1701510, DOI: 10.1109/JSTQE.2013.2247980.

Sandborn P.: FMCW Lidar: Scaling to the Chip-Level and Improving Phase-Noise-Limited Performance. University of California, Berkeley, 2017.

* cited by examiner

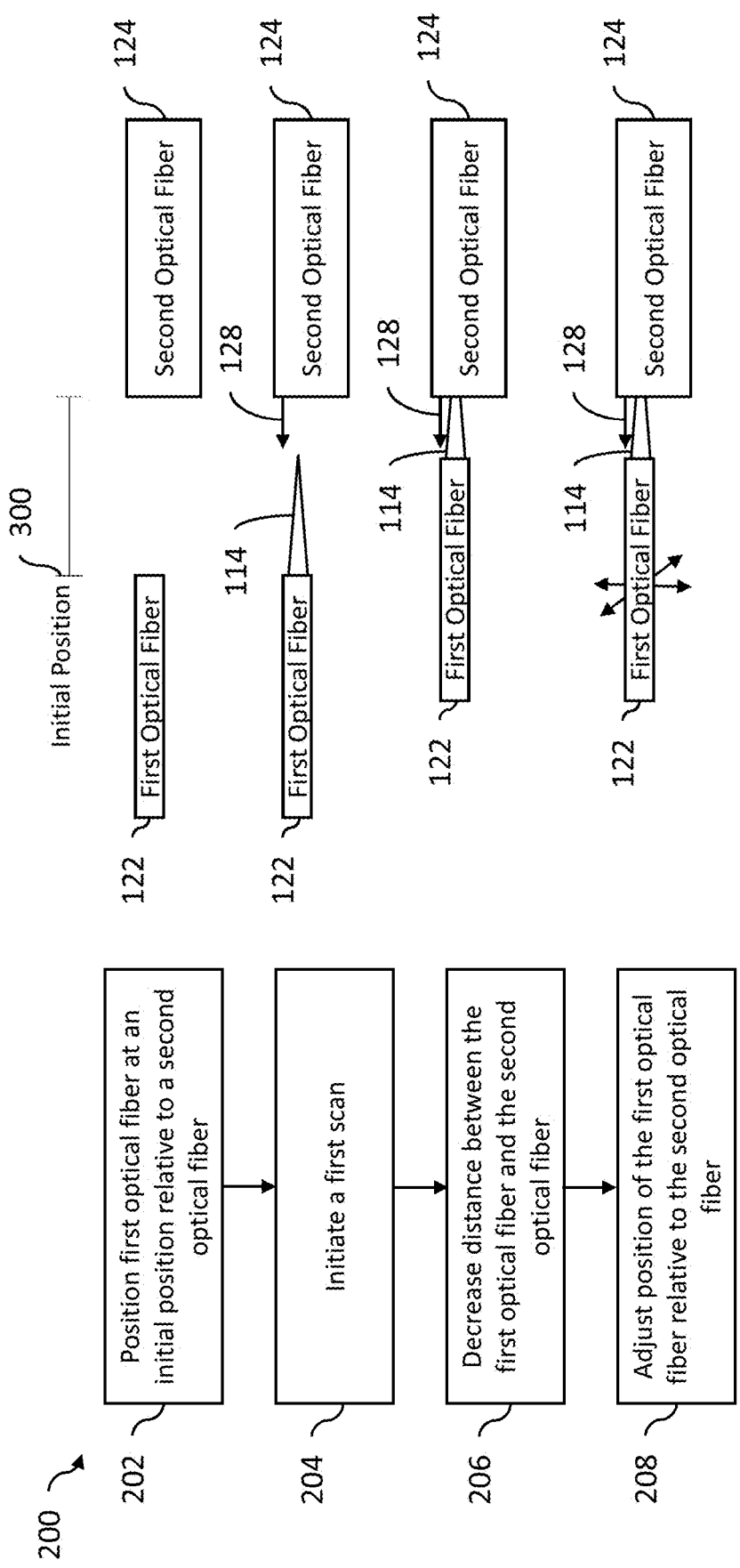

TUNABLE LIGHT SOURCE FOR OPTICAL FIBER PROXIMITY AND TESTING

BACKGROUND

The present disclosure relates generally to optical devices including systems and methods for optical fiber alignment and testing for an optical device using a tunable light source.

Photonic devices which leverage optical fibers may be used for data transmission in various applications, such as telecommunication devices, modulators, and so forth. For such devices to work properly, optical fibers of the device should be aligned in close proximity (e.g., in the micrometer order).

Some systems may use cameras or proximity sensors for optical fiber alignment. However, such systems may suffer from various drawbacks. For example, a camera may not be precise enough for initially aligning the optical fibers. Furthermore, the camera and other components of the system may have fixtures which occlude line of sight for the camera. Additionally, a contact or proximity sensor may require pre-adjustment of the relative positions of the optical fibers, which may be labor intensive.

SUMMARY

The present technology provides improved alignment systems for photonic devices.

In one implementation of the present technology, a system for fiber optic alignment is disclosed. The system may include a light source configured to project a beam. The system may include an interferometer communicably coupled to the light source. The interferometer may be arranged intermediate the light source and a first optical fiber to be aligned with a second optical fiber. The system may include a detector communicably coupled to an output of the interferometer. The system may include a computing system including an optical analysis processing circuit. The optical analysis processing circuit may include a processor and memory. The memory may be structured to store instructions that, when executed by the processor, cause the processor to generate a control signal for the light source to project a beam through the interferometer to produce a measurement beam directed through the first optical fiber and a reference beam. The instructions may further cause the processor to detect, via the detector, an interference beam from the second optical fiber based on the measurement beam. The instructions may further cause the processor to move a position of the first optical fiber relative to the second optical fiber based on the interference beam and the reference beam.

In another implementation of the present technology, a system for photonic device testing is disclosed. The system may include a light source configured to be tuned across a plurality of wavelengths. The system may include an interferometer communicably coupled to the light source. The interferometer may be communicably coupled to a first optical fiber corresponding to an input of a device under testing (DUT) and a second optical fiber corresponding to an output of the DUT. The system may include a detector communicably coupled to an output of the interferometer. The system may include a computing system including an optical analysis processing circuit. The optical analysis processing circuit may include a processor and memory. The memory may be structured to store instructions that, when executed by the processor, cause the processor to generate a control signal for the light source to project a beam through the interferometer to produce a measurement beam directed through the first optical fiber and a reference beam. The instructions may cause the processor to sweep the beam from the light source across a plurality of wavelengths. The instructions may cause the processor to receive, from the detector, a beat signal corresponding to the reference beam and an interference beam from the second optical fiber of the DUT. The instructions may cause the processor to perform a fast Fourier transform (FFT) within segmented windows of the beat signal to generate an output signal for determining one or more characteristics of the DUT.

In yet another implementation of the present technology, a method is disclosed. The method may include generating a control signal for a light source to project a beam through an interferometer to produce a measurement beam directed through a first optical fiber corresponding to an input of a device under testing (DUT) and a reference beam. The method may include sweeping the beam from the light source across a plurality of wavelengths. The method may include receiving, from a detector communicably coupled to the interferometer, a beat signal corresponding to the reference beam and an interference beam from a second optical fiber corresponding to an output of the DUT. The method may include performing a fast Fourier transform (FFT) within segmented windows of the beat signal to generate an output signal for determining one or more characteristics of the DUT.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2 depicts a flow chart showing an example method of optical fiber alignment in accordance with an illustrative embodiment.

FIG. 3 depicts an example series of movements of optical fibers corresponding to the example method of FIG. 2 in accordance with an illustrative embodiment.

DETAILED DESCRIPTION

Figure 1:
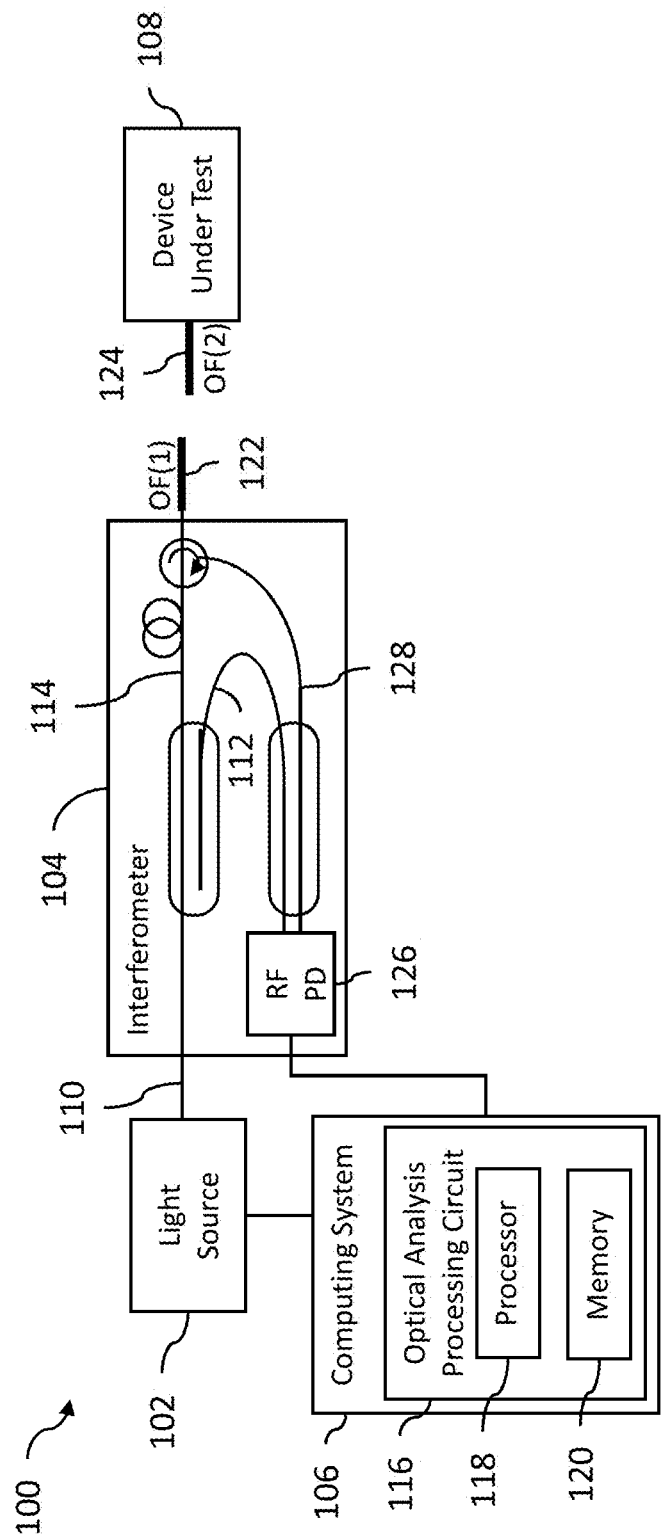
FIG. 1 depicts a system for optical fiber alignment in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods for alignment and testing of photonic devices using a tunable light source. The aspects described herein leverage the benefits of interferometers and a tunable light source for accurately aligning optical fibers with a photonic device under testing.

As will be discussed in further detail below, a system includes a light source configured to project a beam to an interferometer. The interferometer may be configured to generate a reference beam and a measurement beam from the beam of the light source. The interferometer may be configured to project the measurement beam through a first optical fiber towards a second optical fiber. A detector may be communicably coupled to an output of the interferometer. An optical analysis processing circuit may be configured to generate a control signal for the light source to project a beam through the interferometer to produce a measurement beam directed through the first optical fiber towards the second optical fiber and a reference beam. The optical analysis processing circuit may be configured to detect an interference beam from the second optical fiber based on the measurement beam. The optical analysis processing circuit may be configured to move a positon of the first optical fiber relative to the second optical fiber based on the interference beam and the reference beam.

Referring now to FIG. 1, a schematic diagram of a system 100 for optical fiber alignment is shown, according to one example embodiment. The system 100 includes a light source 102, an interferometer 104, a computing system 106, and a device under testing (DUT) 108. The computing system 106 may include an optical analysis processing circuit 116 (also referred to as "processing circuit") having a processor 118 and memory 120. The processing circuit 116 may be configured to generate a control signal for the light source to project a beam 110 through the interferometer 104. The interferometer 104 may be configured to use the beam 110 from the light source 102 for generating a reference beam 112 and a measurement beam 114 for projecting through a first optical fiber 122 towards a second optical fiber 124 of the DUT 108. A detector 126 of the interferometer 104 may be configured to generate a beat signal corresponding to the reference beam 112 and an interference beam 128 from the DUT 108. As described in greater detail below, the processing circuit 116 may be configured to move a position of the first optical fiber 122 relative to the second optical fiber 124 based on the beat signal.

The light source 102 may be or include any device(s) or component(s) designed or implemented to produce a beam 110 of light. In some embodiments, the light source 102 may be tunable (e.g., across a plurality of wavelengths, a plurality of frequencies, etc.). The light source 102 may be a tunable laser, for instance. The light source 102 may be communicably coupled to the computing system 106. The computing system 106 may be configured to control light output from the light source 102, various characteristics of the light, and so forth.

The computing system 106 can include an optical analysis processing circuit 116. The optical analysis processing circuit 116 can include a processor 118 and memory 120. The processor 118 may include any component or group of components that are configured to execute, implement, and/or perform any of the processes or functions described herein or any form of instructions to carry out such processes or cause such processes to be performed. In one or more arrangements, the processor 118 can be a main processor of the system 100. Examples of suitable processors include microprocessors, microcontrollers, digital signal processing (DSP) processors, and other circuitry that can execute software. Further examples of suitable processors include, but are not limited to, a central processing unit (CPU), an array processor, a vector processor, a DSP processor, a field-programmable gate array (FPGA), a programmable logic array (PLA), an application specific integrated circuit (ASIC), programmable logic circuitry, and a controller. The processor 118 can include at least one hardware circuit (e.g., an integrated circuit) configured to carry out instructions contained in program code. In arrangements in which there is a plurality of processors, such processors can work independently from each other or one or more processors can work in combination with each other.

The memory 120 can be structured for storing one or more types of data. The memory 120 store can include volatile and/or non-volatile memory. Examples of suitable memory 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 120 can be a component of the processor 118, or the memory 120 can be operatively connected to the processor 118 for use thereby. In some arrangements, the memory 120 can be located remotely and accessible by the processor 118, such as via a suitable communications device.

The interferometer 104 may be any device(s) or component(s) designed or implemented to merge two sources of light to create an interference pattern. In some embodiments, the interferometer 104 may include a beam splitter, a reference mirror, and a detector 126. Generally speaking, the light source 102 projects light (e.g., the beam 110) to the beam splitter. The beam splitter splits the light from the light source 102 onto the reference mirror for generating the reference beam 112 and the measurement beam 114 towards the DUT 108. The detector 126 may be configured to detect the reference beam 112 and an interference beam 128. The interference beam 128 may be a return beam from the DUT 108 (e.g., the second optical fiber 124). Hence, the detector 126 may be a photo-detector. The detector 126 may be configured to detect various frequencies of light. For instance, the detector 126 may be configured to detect light in the radio frequency spectrum. The detector 126 may be configured to combine the reference beam and interference beam 128 to generate a beat signal.

Figure 4:
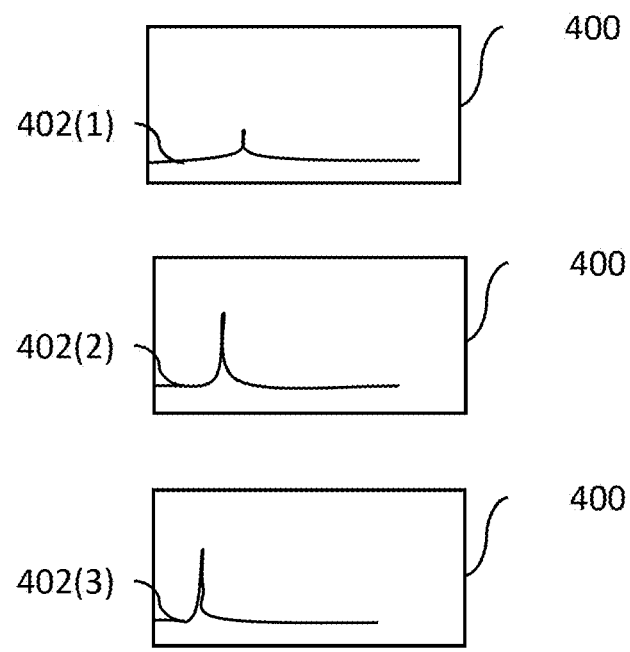
FIG. 4 depicts a series of scans based on data from an interferometer of FIG. 1, in accordance with an illustrative embodiment.

Referring now to FIG. 1 through FIG. 4, the system 100 may be used for aligning a first optical fiber 122 with a second optical fiber 124. Specifically, FIG. 2 is a flow chart showing a method 200 of aligning optical fibers 122, 124, FIG. 3 shows a series of movements of the optical fiber(s) 122, 124, and FIG. 4 shows a series of scans based on data from the interferometer 104, according to illustrative embodiments.

The first optical fiber 122 may be positioned at an initial position relative to the second optical fiber 124 (BLOCK 202). In some embodiments, the first optical fiber 122 may be positioned at the initial position 300 (e.g., at a predetermined distance) from the second optical fiber 124 (e.g., of the DUT 108). The predetermined distance may be a nominal distance (e.g., 150 mm, 125 mm, 100 mm, 75 mm, 50 mm, etc.). In some embodiments, the processing circuit 116 may be configured to move the first optical fiber 122 to an initial position 300 at the predetermined distance from the second optical fiber 124. In some embodiments, the processing circuit 116 may roughly align the first optical fiber 122 and second optical fiber 124. The processing circuit 116 may be configured to perform one or more scans using the light source 102 and beams from the detector 126 of the interferometer 104 for moving the first optical fiber 122 relative to the second optical fiber 124 (or vice versa).

The processing circuit 116 may be configured to initiate a first scan (BLOCK 204). The processing circuit 116 may be configured to initiate a first scan by generating a control signal for the light source 102 to project a beam 110 through the interferometer 104, which uses the beam 110 to generate a reference beam 112 and measurement beam 114. In some embodiments, the processing circuit 116 may tune the beam 110 across a plurality of wavelengths and/or frequencies. The interferometer 104 may be configured to generate a reference beam 112 and a measurement beam 114 using the beam 110 from the light source 102. The interferometer 104 may be configured to direct the measurement beam 114 through the first optical fiber 122 towards the second optical fiber 124. Light from the measurement beam 114 may at least partially reflect off the second optical fiber 124 and back towards the first optical fiber 122. Such reflected light from the second optical fiber 124 may be referred to as an interference beam 128. The interference beam 128 may increase in intensity or power as the first optical fiber 122 is moved closer and is more aligned with the second optical fiber 124.

The detector 126 of the interferometer 104 may be configured to detect the interference beam 128 and reference beam 112. The detector 126 may be configured to combine the interference beam 128 and reference beam 112 to generate a beat signal. The beat signal may be proportional to the distance between the first and second optical fibers 122, 124. For example, as the distance between the first and second optical fibers 122, 124 decreases, peaks of the beat signal may increase. The peaks may increase because more power is translated from the first optical fiber 122 to the second optical fiber 124 and back to the first optical fiber 122. The detector 126 may be configured to provide the beat signal to the computing system 106 for analysis.

The processing circuit 116 may be configured to analyze the beat signal to determine a distance between the first optical fiber 122 and the second optical fiber 124. Specifically, FIG. 4 shows a series of images 400 including signals corresponding to the beat signal from the detector 126. The series of images 400 shown in FIG. 4 may correspond to the movements of the first optical fiber 122 relative to the second optical fiber shown in FIG. 3. In some embodiments, the processing circuit 116 may be configured to perform a fast Fourier transform (FFT) of the beat signal from the detector 126 to generate an optical Fourier domain reflectometry (OFDR) signal 402. The OFDR signal may be a measurement of a power of the interference beam 128 from the second fiber 124. As shown in FIG. 3 and FIG. 4, the first OFDR signal 402(1) may be proportional to a distance between the first optical fiber 122 and the second optical fiber 124. The processing circuit 116 may be configured to compare data from or corresponding to the OFDR signal 402 to a threshold. For example, the processing circuit 116 may be configured to compare a peak of the OFDR signal from the detector 126 to a threshold. The threshold may correspond to a threshold distance. The processing circuit 116 may be configured to store the threshold in memory 120, for example.

The processing circuit 116 may be configured to decrease a distance between the first optical fiber 122 and second optical fiber 124 (BLOCK 206). The processing circuit 116 may be configured to decrease the distance based on the OFDR signal from the detector 126. The processing circuit 116 may be configured to decrease the distance until the OFDR signal from the detector 126 satisfies the threshold from memory 120. In some embodiments, the processing circuit 116 may be configured to iteratively perform scans, analyze OFDR signals from the detector 126 based on the scans, and decrease the distance between the first and second optical fibers 122, 124. The processing circuit 116 may be configured to decrease the distance between the first and second optical fiber 122, 124 until the first optical fiber 122 is located at the threshold distance from the second optical fiber 124. The threshold distance may be, for instance, 50 μm, 40 μm, 30 μm, 20 μm, 10 μm, etc.

In some embodiments, the processing circuit 116 may be configured to modify a scan rate (e.g., a duration between two scans). In some embodiments, the processing circuit 116 may be configured to modify the scan rate based on a distance between the first optical fiber 122 and the second optical fiber 124. For example, the processing circuit 116 may be configured to increase the scan rate as the distance between the first optical fiber 122 and the second optical fiber 124 decreases. The processing circuit 116 may be configured to increase the scan rate at decreased distances to provide more granular feedback for movement of the first optical fiber 122 relative to the second optical fiber 124 (where the optical fibers 122, 124 are in closer proximity). In some embodiments, the processing circuit 116 may be configured to switch from a first scan rate to a second scan rate based on the distance between the first optical fiber 122 and the second optical fiber 124. In some embodiments, the processing circuit 116 may be configured to switch between the scan rate based on a comparison of the distance to a threshold distance. The threshold described herein may be separate from the threshold distance described above. For instance, the first optical fiber 122 may initially be positioned at an initial position relative to the second optical fiber 124 (e.g., 100 mm, for example). The processing circuit 116 may be configured to perform scans (e.g., at a first scan rate) and move the first optical fiber 122 closer to the second optical fiber 124 until the first optical fiber 122 is located at a threshold distance corresponding to the scan rate. Once the first optical fiber 122 is located at the threshold distance from the second optical fiber 124 (e.g., 50 μm, for example), the processing circuit 116 may switch to the second scan rate. The processing circuit 116 may iteratively perform scans at the second scan rate (e.g., greater than the first scan rate) and move the first optical fiber 122 closer to the second optical fiber 124 until the first optical fiber is located at another threshold distance (e.g., for lateral adjustment and tuning, as described below).

The processing circuit 116 may be configured to adjust a lateral position of the first optical fiber 122 relative to the second optical fiber 124 (BLOCK 208). The processing circuit 116 may be configured to adjust the lateral position of the first optical fiber 122 relative to the second optical fiber 124 responsive to the first optical fiber 122 being located at a threshold distance from the second optical fiber 124 (e.g., in the z-direction). The processing circuit 116 may be configured to adjust the position of the first optical fiber 122 relative to the second optical fiber 124 in the x and y-direction (as shown in FIG. 3) while maintaining the position of the optical fiber 122 relative to the second optical fiber 124 in the z-direction. Hence, the processing circuit 116 may be configured to adjust a position of the first optical fiber 122 relative to the second optical fiber 124 in a lateral direction while maintaining the same distance between the optical fibers 122, 124. The processing circuit 116 may be configured to adjust the lateral position of the first optical fiber 122 relative to the second optical fiber 124 to maximize the power of the interference signal from the second optical fiber 124. As shown in FIG. 4, a peak of the interference signal increases in the progression as the processing circuit 116 adjusts the lateral position of the first optical fiber 122 relative to the second optical fiber 124, thereby maximizing the power of the interference signal.

Figure 5:
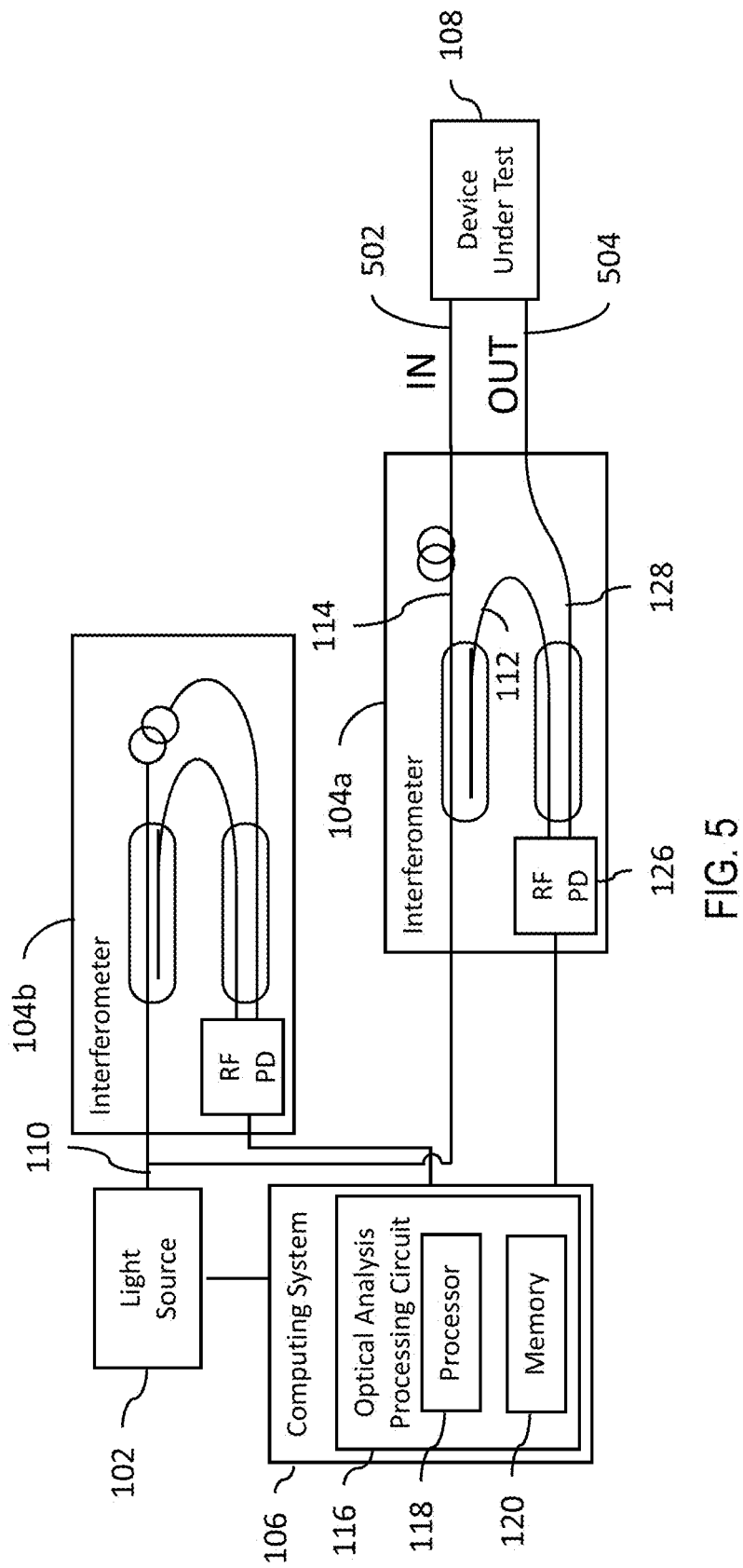
FIG. 5 depicts a block diagram of a system for monitoring one or more conditions of a device under testing, in accordance with an illustrative embodiment.

Referring now to FIG. 5, depicted is a system 500 for monitoring one or more conditions of a device under testing 108. The system 500 may include components similar to those described above with reference to FIG. 1. For example, the system 500 may include a light source 102, an interferometer 104, a computing system 106 including a processing circuit 116, and so forth. In some embodiments, the system 500 may include a first interferometer 104a and a second interferometer 104b. The first interferometer 104a may be used for transmitting light from the light source 102 through an input optical fiber 502 of the DUT 108 and detecting light from an output optical fiber 504 of the DUT 108. The second interferometer 106b may be used for generating a sinusoidal signal for use by the processing circuit 116, as described in greater detail below.

As shown in FIG. 5, the light source 102 may be configured to project a beam 110 through the first interferometer 104a. The first interferometer 104a may be configured to split the beam 110 into a reference beam 112 and measurement beam 114 (similar to the reference beam 112 and measurement beam 114 described above with reference to FIG. 1). The interferometer 104a may be configured to transmit, direct, or otherwise provide the measurement beam 114 to the input optical fiber 502 of the DUT 108. The output optical fiber 504 of the DUT 108 may be communicably coupled to the detector 126. Where the measurement beam 114 is provided through the DUT 108 (e.g., from the input optical fiber 502 through the DUT 108 and out of the output optical fiber 504), the DUT 108 may be configured to generate an interference beam 128. The interference beam 128 may correspond to various performance characteristics of the DUT 108. For example, the interference beam 128 may be used for characterizing various performance characteristics of the DUT 108, such as the polarization dependent loss (PDL), wavelength dependent loss (WDL), and other similar measurements.

Figure 6:
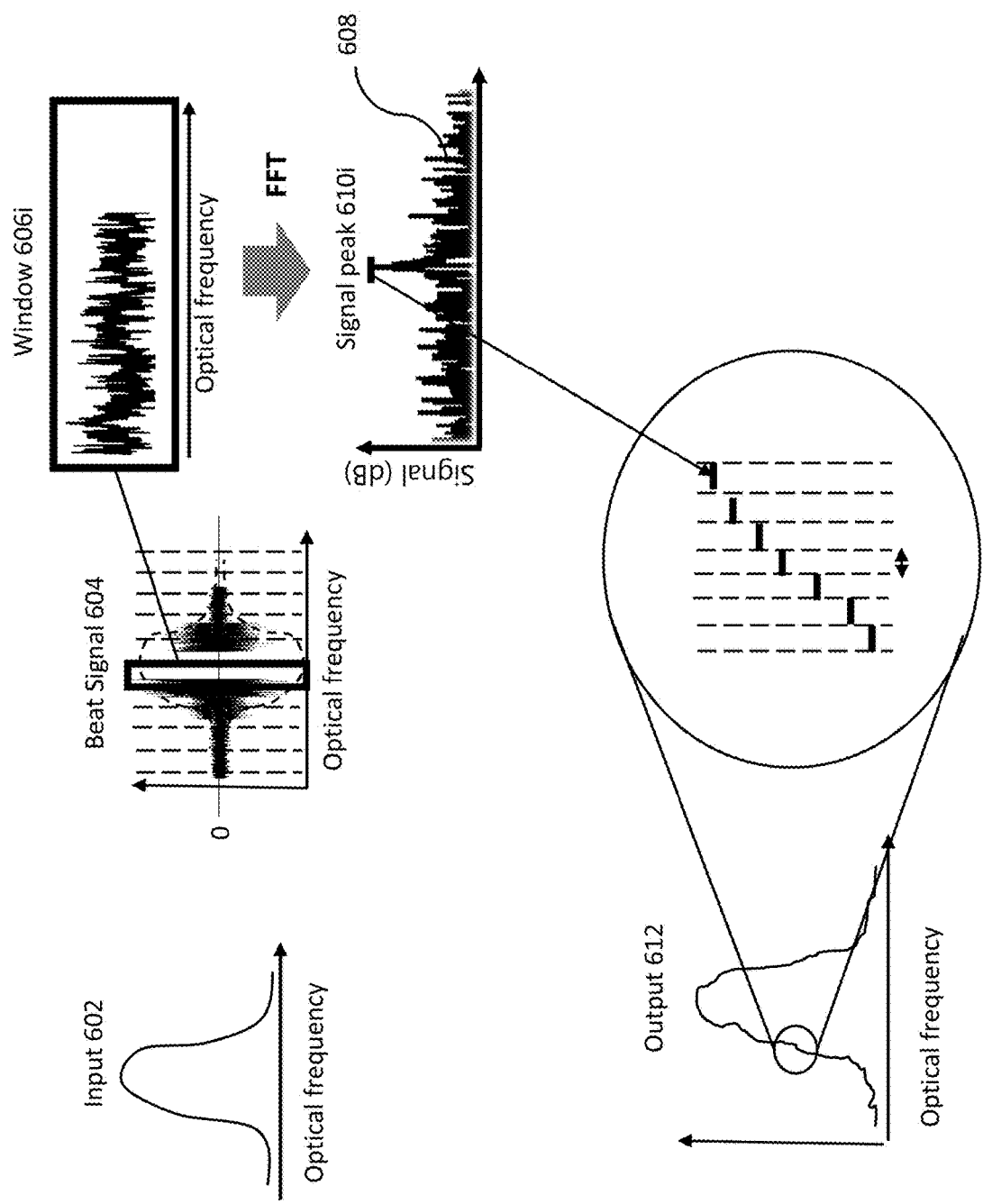
FIG. 6 depicts a series of signals corresponding to a beam from a light source of FIG. 5 and an interference beam from an output optical fiber of the device under testing of FIG. 5, in accordance with an illustrative embodiment.

Referring to FIG. 5 and FIG. 6, the processing circuit 116 may be configured to sweep a wavelength of the beam 110 from the light source 102. Specifically, FIG. 6 depicts a series of signals 600 corresponding to the beam 110 from the light source 102 and the interference beam 128 from the output optical fiber 504 of the DUT 108. The processing circuit 116 may sweep the wavelength of the beam 110 (e.g., as shown as the input signal 602) and monitor the detected power (e.g., of light from the output optical fiber 504) over the tuning range (as shown as the output signal 612). As described in greater detail below, the processing circuit 116 may be configured to process the signal corresponding to the interference beam 128 for identifying characteristics of the DUT 108.

The processing circuit 116 may be configured to generate control signals for the light source 102 to sweep the beam 110 of the light source 102 across a plurality of wavelengths. As shown in FIG. 6, the processing circuit 116 may be configured to sweep a wavelength of the input signal 602 across the optical frequency for the light source 102. The light source 102 may project the beam 110 through the interferometer 104a to the input optical fiber 502 of the DUT 108. The detector 126 may be configured to receive the reference beam 112 and interference beam 128. The detector 126 may be configured to combine the reference beam 112 and interference beam 128 to generate a beat signal 604. The processing circuit 116 may be configured to segment, separate, or otherwise divide the beat signal 604 into a plurality of windows 606. Each window 606 may have a respective range of frequencies. In some embodiments, the window 606 width may correspond to a resolution of the input signal 602. For example, as the sample rate corresponding to the input signal 602 increases (e.g., a resolution of the wavelengths in which the beam 110 is swept increases), the window 606 may proportionally decrease. Hence, the windows 606 may be more granular as the sample rate increases.

The processing circuit 116 may be configured to perform a FFT of the beat signal 604 within each respective window 606. Specifically, for each portion of the beat signal 604 residing within a respective window 606, the processing circuit 116 may be configured to perform a FFT on the portion of the beat signal 604. The processing circuit 116 may be configured to perform a FFT on the beat signal 604 to generate a gain signal 608. The processing circuit 116 may be configured to identify a signal peak 610 of the gain signal 608. The processing circuit 116 may be configured to generate a plot (e.g., an output signal 612) using the signal peak 610 identified for each window 606. As shown in FIG. 6, the processing circuit 116 may be configured to generate the plot by plotting each signal peak 610$i$ for a corresponding window 606$i$. As such, the plot may be a step plot having an interval corresponding to a size of the window 606. As the window 606 decreases, the plot may be smoother. The processing circuit 116 may be configured to use the output signal 612 for comparing to the input signal 602. For example, the processing circuit 116 may be configured to compare the input signal 602 to the output signal 612 for computing the polarization dependent loss (PDL), wavelength dependent loss (WDL), and the like.

In some embodiments, such as those where the DUT 108 is a wide dynamic range photonic device (e.g., having an operating range across a wide frequency range, such as 70 dB, 75 dB, 80 dB, 85 dB, 90 dB, etc.), the processing circuit 116 may be configured to perform two (or more) sweeps of the beam 110 from the light source 102. The processing circuit 116 may be configured to perform a plurality of sweeps of the beam 110 at different detection levels. For example, the processing circuit 116 may be configured to perform a first sweep of the beam 110 at a first detection level across the plurality of wavelengths and a second sweep of the beam 110 at a second detection level across the same wavelengths. The detector 126 may be configured to receive both interference beams 128 corresponding to the swept beams 110. The processing circuit 116 may be configured to perform a FFT of two beat signals 604 corresponding to the swept beams 110 to generate corresponding signals (e.g., output signals similar to the output signal 612 shown in FIG. 6). The processing circuit 116 may be configured to stitch together the signal corresponding to the first beat signal 604 and the signal corresponding to the second beat signal 604. The processing circuit 116 may be configured to stitch together the two signals to generate a composite signal for comparison with the swept input signals. Such embodiments may provide a simple system for analyzing wide band photonic devices as opposed to performing two separate As shown in FIG. 5, in some embodiments, the system 500 may include a second interferometer 104b communicably coupled to the light source 102 and processing circuit 116. The light source 102 may be arranged to transmit the beam 110 into both the first interferometer 104a and second interferometer 104b. The first interferometer 104a may be configured to generate the beat signal 604 corresponding to the DUT 108 using the beam 110. The second interferometer 104b may be configured to generate a sinusoidal signal using the beam 110 from the light source 102. An output of the second interferometer 104b may be communicably coupled to the processing circuit 116 such that the processing circuit 116 receives the sinusoidal signal generated by the second interferometer 104b. Hence, the processing circuit 116 may include or function as a data acquisition unit for the first interferometer 104a and second interferometer 104b. The processing circuit 116 may be configured to use the sinusoidal signal from the second interferometer 104b for rescaling the beat signal(s) 604 from the first interferometer 104a. The processing circuit 116 may be configured to rescale the beat signal(s) 604 from the first interferometer 104a in the frequency space. Thus, the processing circuit 116 may be configured to rescale the beat signal(s) 604 prior to performing a FFT on the beat signal(s) 604. As such, the sinusoidal signal from the second interferometer 104b may function as a reference signal to compensate for linearity in sweeping the light source 102 across the wavelengths.

Figure 7:
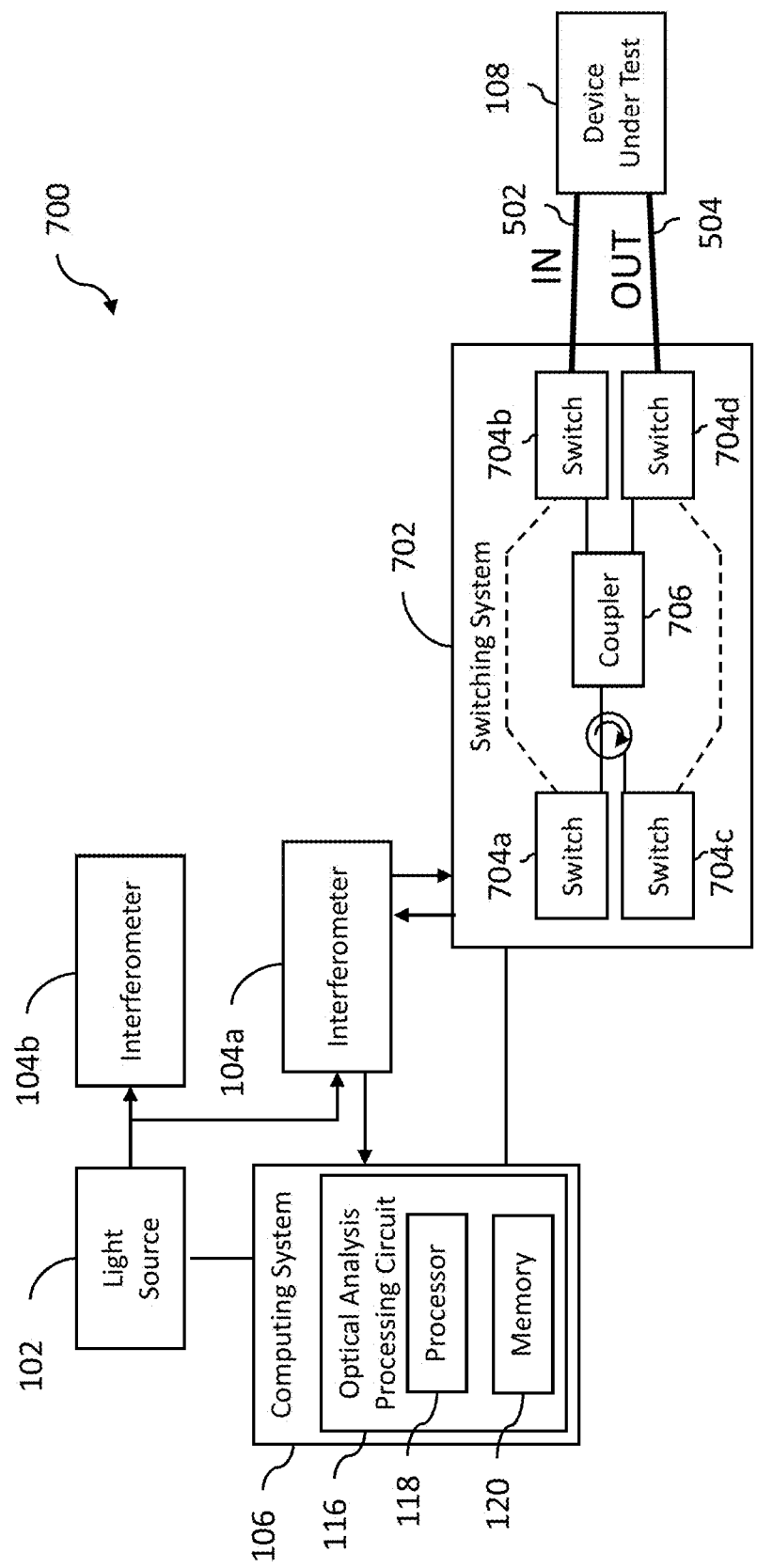
FIG. 7 depicts a block diagram of a system which incorporates components from the system of FIG. 1 and the system of FIG. 5, in accordance with an illustrative embodiment.

Referring now to FIG. 7, a system 700 which combines the system 100 of FIG. 1 and system 500 of FIG. 5 is shown, according to an illustrative embodiment. As shown in FIG. 7, the system 700 may include a switching system 702 including a plurality of switches 704 and a coupler 706. The switching system 702 (including the switches 704 and coupler 706) may be communicably coupled to the processing circuit 116. The processing circuit 116 may be configured to generate control signals for the switches 704 and coupler 706 to switch between optical fiber alignment using the components described in FIG. 1 and benchmarking and testing of a DUT 108 using the components shown in FIG. 5.

As shown in FIG. 7, the switching system 702 may be arranged intermediate the DUT 108 and first interferometer 104. The switching system 702 may include a first switch 704a, a second switch 704b, a third switch 704c, and a fourth switch 704d. The first switch 704a may be communicably coupled to the interferometer 104a, the coupler 706, and the second switch 704b. The second switch 704b may be communicably coupled to the coupler 706, the first switch 704a, and the input optical fiber 502 of the DUT 108. The third switch 704c may be communicably coupled to the interferometer 104a, the coupler 706, and the fourth switch 704d. The fourth switch 704d may be communicably coupled to the coupler 706, the third switch 704c, and the output optical fiber 504 of the DUT 108.

Figure 8:
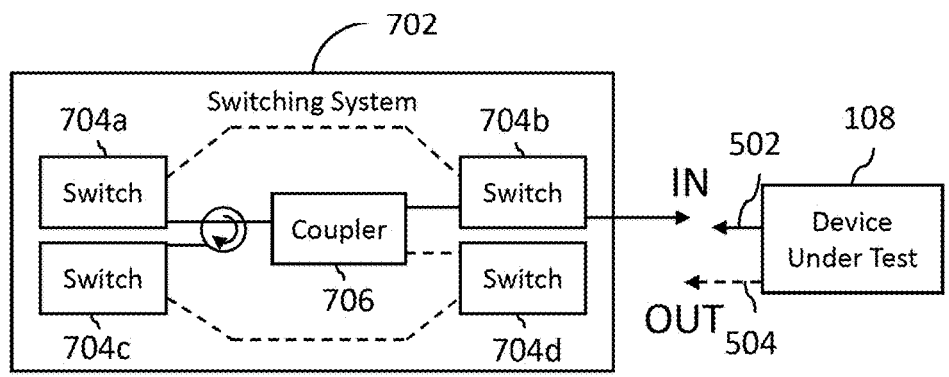
FIG. 8 through FIG. 10 depict a series of paths in which light may travel across a switching system of the system of FIG. 7, in accordance with illustrative embodiments.
Figure 9:
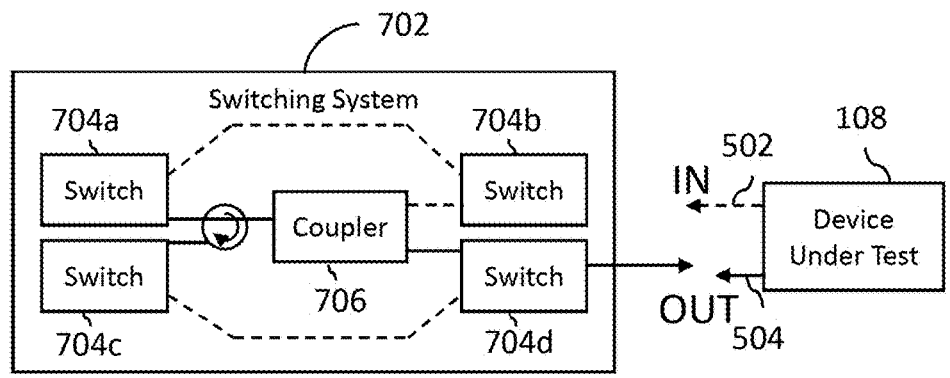
Figure 10:
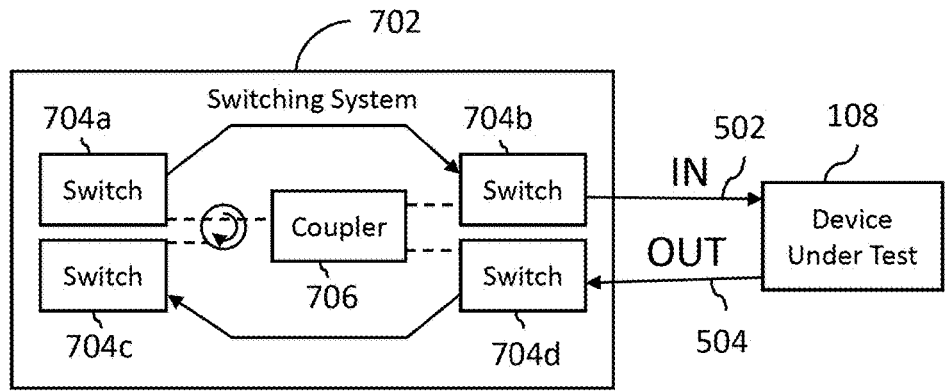

Referring to FIG. 7 and FIGS. 8-10, the processing circuit 116 may be configured to switch between optical fiber alignment for the input and output optical fibers 502, 504 and measurement of characteristics for the DUT 108. Specifically, FIG. 8 through FIG. 10 show a series of paths in which light may travel across the switching system 702. First switch 704a may switch between transmitting the measurement beam 114 to the coupler 706 and transmitting the measurement beam 114 to the second switch 704b.

FIG. 8 shows a path (in solid) for performing fiber optic alignment for the input optical fiber 502 of the DUT 108. In FIG. 8, the measurement beam 114 from the light source 102 travels through the first switch 704a, through the coupler 706, through the second switch 704b, and towards the input optical fiber 502. Light reflected from the input optical fiber 502 (e.g., an interference beam 128) passes back through the second switch 704b, through the coupler 706, and through the third switch 704c and to the first interferometer 104a for generating the beat signal. The processing circuit 116 may be configured to control the switching system 702 to provide the arrangement shown in FIG. 8 and align optical fibers for the input optical fiber 502 as described above with reference to FIG. 1. Once the optical fibers for the input optical fiber 502 of the DUT 108 are aligned, the processing circuit 116 may be configured to switch to the arrangement shown in FIG. 9. Specifically, FIG. 9 shows a path (in solid) for performing fiber optic alignment for the output optical fiber 504 of the DUT 108. Similar to the arrangement shown in FIG. 8, in FIG. 9, the measurement beam 114 from the light source 102 travels through the first switch 704a, through the coupler 706, through the fourth switch 704d, and towards the output optical fiber 504. Light reflected from the output optical fiber 504 (e.g., an interference beam 128) passes back through the fourth switch 704d, through the coupler 706, and through the third switch 704c and to the first interferometer 104a for generating the beat signal. Once both the input and output optical fibers 502, 504 are aligned, the processing circuit 116 may be configured to switch to the arrangement shown in FIG. 10 for measuring performance characteristics of the DUT 108. Specifically, FIG. 10 shows a path (in solid) for performing measurement across the DUT 108 for determining one or more characteristics of the DUT 108. In FIG. 10, the measurement beam 114 from the light source 102 travels through the first switch 704a and the second switch 704b into the input optical fiber 502. The measurement beam 114 then passes through the DUT 108 and out of the output optical fiber 504 (e.g., as an interference beam 128). The interference beam 128 then passes through the fourth switch 704d, through the third switch 704c, and into the interferometer 104a. Accordingly, the processing circuit 116 may be configured to switch between optical fiber alignment for each optical fiber 502, 504 of the DUT 108 and, once optical fibers are aligned, the processing circuit 116 may be configured to measurement of one or more performance characteristics of the DUT 108.

Figure 11:
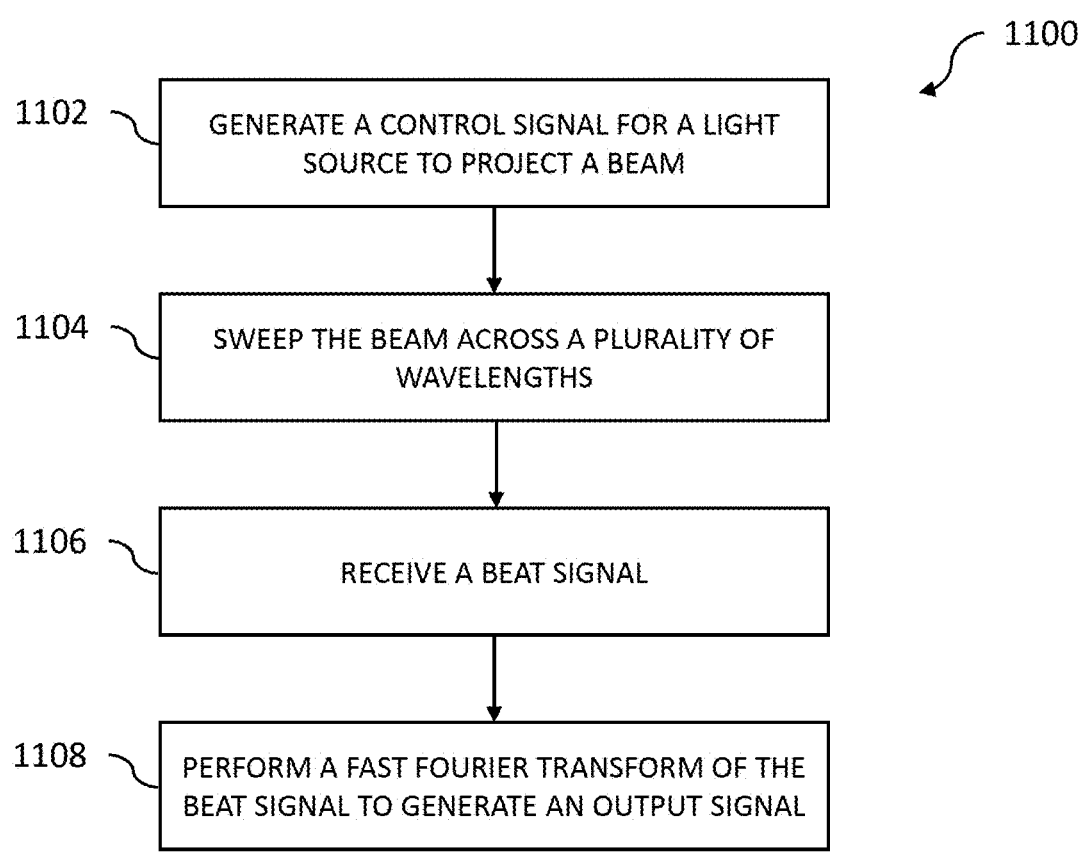
FIG. 11 depicts a flow chart of a method of measurement and analysis of a device under testing, in accordance with an illustrative embodiment.

Now that various aspects of the disclosed systems and components have been described, a method of measurement and analysis of a DUT 108 will be described with reference to FIG. 11. The flow chart shown in FIG. 11 provides only one example method. Accordingly, the following disclosure should not be limited to each and every function block shown in FIG. 11. To the contrary, the method does not require each and every function block shown in FIG. 11. In some examples, the method may include additional function blocks. Further, the method does not need to be performed in the same chronological order shown in FIG. 11.

Referring now to FIG. 11, a flow chart is shown to depict an example method 1100 of alignment and testing of a photonic device under testing, in accordance with an illustrative embodiment. As a brief overview of the method 1100, at operation 1102, a processing circuit 116 generates a control signal for a light source to project a beam. At operation 1104, the processing circuit 116 sweeps the beam across a plurality of wavelengths. At operation 1106, the processing circuit 116 receives a beat signal. At operation 1108, the processing circuit 116 performs a fast Fourier transform (FFT) of the beat signal to generate an output signal.

As shown in FIG. 11, the method 1100 may include operation 1102. At operation 1102, a processing circuit 116 generates a control signal for a light source 102 to project a beam 110. In some embodiments, the processing circuit 116 may generate a control signal for a light source 102 to project a beam 110 through an interferometer 104a to produce a measurement beam 114 directed through a first optical fiber 502 corresponding to an input of a device under testing (DUT) 108 and a reference beam 112. In some embodiments, the light source 102 may be a tunable light source. In some embodiments, a wavelength and/or frequency of the beam may be tuned (e.g., by corresponding control signals from the processing circuit 116).

In some embodiments, the interferometer 104 may be a first interferometer 104a. The processing circuit 116 may generate the control signal to project a beam through both the first interferometer 104a and a second interferometer 104b. The second interferometer 104b may generate a sinusoidal signal corresponding to the beam 110 from the light source 102. As described in greater detail below, the processing circuit 116 may use the sinusoidal signal for rescaling a beat signal corresponding to the DUT 108.

At operation 1104, the processing circuit 116 sweeps the beam across a plurality of wavelengths. In some embodiments, the processing circuit 116 may sweep the beam across an operational wavelength corresponding to the DUT 108. In some embodiments, the processing circuit 116 may sweep the beam with a resolution. The resolution may correspond to a difference between wavelengths of two sequential beams. In some embodiments, the swept range may be, for example, between 1550 nm to 100 nm range (though other ranges may be used for sweeping the beam from the light source 102).

At operation 1106, the processing circuit 116 receives a beat signal. In some embodiments, the processing circuit 116 may receive the beat signal from a detector 126 communicably coupled to the interferometer 104. In some embodiments, the detector 126 may be a component of the interferometer 104. In some embodiments, the detector 126 may be separate from and in communication with the interferometer 104. The beat signal may correspond to the reference beam of the interferometer 104 and an interference beam. The interference beam may be from a second optical fiber 504 corresponding to an output of the DUT 108. In embodiments in which the light source 102 projects the beam 110 through both the first and second interferometer 104a, 104b, the processing circuit 116 may rescale the beat signal in the frequency space using the sinusoidal signal from the second interferometer. The processing circuit 116 may rescale the beat signal using the sinusoidal to compensate for the linearity of the swept beam 110.

At operation 1108, the processing circuit 116 performs a fast Fourier transform (FFT) of the beat signal to generate an output signal. In some embodiments, the processing circuit 116 may perform an FFT within segmented windows of the beat signal. The windows may correspond to a resolution of the wavelengths across which the beam 110 is swept (e.g., at operation 1104). For example, the windows may have a width which correspond to the resolution. As the resolution increases, the width may decrease. The processing circuit 116 may parse the beat signal to generate the segmented windows for the beat signal. The processing circuit 116 may perform a FFT for each segmented window. The processing circuit may perform an FFT within the segmented windows to generate an output signal for determining one or more characteristics of the DUT 108. In some embodiments, the one or more characteristics may include a polarization dependent loss (PDL) measurement, a wavelength dependent loss (WDL) measurement, etc. In some embodiments, the processing circuit 116 may generate the output signal by identifying a peak of the FFT for each segmented window of the beat signal. The processing circuit 116 may generate the output signal by plotting each signal peak for each window. Accordingly, the plotted signal peak for each window may be a step plot with an interval corresponding to each window.

In some embodiments, such as those where the DUT 108 is a wide dynamic range photonic device, the processing circuit 116 may perform operations 1102 through 1108 at two detection levels. For example, the processing circuit 116 may perform operations 1102 through 1108 at a first detection level (e.g., for the detector 126), and perform operations 1102 through 1108 at a second detection level (e.g., for the detector 126). In other words, the processing circuit 116 may receive a first and second beat signal from the detector 126 at a first and second detection level, respectively. The processing circuit 116 may perform an FFT for both of the first beat signal and second beat signal (e.g., in the segmented windows for each of the first and second beat signals). The processing circuit 116 may perform the FFT for the first beat signal to generate a first signal and perform the FFT for the second beat signal to generate a second signal. The processing circuit 116 may stitch together the first signal and the second signal to generate the output signal for determining one or more characteristics of the wide dynamic range photonic device.

In some embodiments, the processing circuit 116 may generate one or more control signal for a switching system including a plurality of switches. The processing circuit 116 may generate the control signals to switch between the arrangements shown in FIG. 8, FIG. 9, and FIG. 10. Hence, the processing circuit 116 may generate a control signal to switch between generation of the output signal for determining the one or more characteristics of the DUT, for optical fiber alignment of the first optical fiber 502, and optical fiber of the second optical fiber 504. In some embodiments, the processing circuit 116 may generate a first control signal to perform optical fiber alignment for the first optical fiber 502. Once optical alignment for the first optical fiber 502 is performed, the processing circuit 116 may generate a second control signal to perform optical fiber alignment for the second optical fiber 504. Once optical alignment for both optical fibers 502, 504 are performed, the processing circuit 116 may generate a third control signal to determine one or more characteristics of the DUT.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions.

Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary.

It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety.

Definitions that are contained in text incorporated by reference are excluded to the extent that they contradict definitions in this disclosure.

Other embodiments are set forth in the following claims.

What is claimed is:

1. A system for fiber optic alignment, the system comprising:
    a light source configured to project a beam;
    an interferometer communicably coupled to the light source, the interferometer arranged intermediate the light source and a first optical fiber to be aligned with an input of a device under testing (DUT), the first optical fiber separated a distance from the input;
    a detector communicably coupled to an output of the interferometer; and
    a computing system including an optical analysis processing circuit, the optical analysis processing circuit including a processor and memory, the memory being structured to store instructions that, when executed by the processor, cause the processor to:
        generate a control signal for the light source to project a beam through the interferometer to produce a measurement beam directed through the first optical fiber towards the input and a reference beam;
        detect, via the detector, an interference beam from the input based on the measurement beam; and
        move a lateral position of the first optical fiber relative to the input, to reduce the distance between the first optical fiber and the input, based on the interference beam and the reference beam.

2. The system of claim 1, wherein the instructions further cause the processor to move a longitudinal position of the first optical fiber relative to the input to decrease the distance between the first optical fiber and the input.

3. The system of claim 1, wherein the instructions further cause the processor to:
    receive, from the detector, a beat signal corresponding to the reference beam and the interference beam; and
    perform a fast Fourier transform (FFT) of the beat signal to generate an optical Fourier domain reflectometry (OFDR) signal;
    wherein moving the position of the first optical fiber relative to the input is performed to maximize the OFDR signal.

4. The system of claim 1, wherein moving the position of the first optical fiber relative to the input is performed to maximize a power of the interference beam relative to the measurement beam.

5. The system of claim 1, wherein the instructions cause the processor to:
    modify a scan rate corresponding to the measurement beam based on the distance between the first optical fiber and the input.

6. The system of claim 5, wherein modifying the scan rate comprises:
    performing a first plurality of scans at a first scan rate where the distance between the first optical fiber and the input is greater than a threshold distance; and
    performing a second plurality of scans at a second scan rate where the distance between the first optical fiber and the input is less than the threshold distance.

7. The system of claim 6, wherein the first scan rate is greater than the second scan rate.

8. A system for photonic device testing, the system comprising:
    a light source configured to be tuned across a plurality of wavelengths;

an interferometer communicably coupled to the light source, the interferometer communicably coupled to a first optical fiber corresponding to an input of a device under testing (DUT) and a second optical fiber corresponding to an output of the DUT, the first optical fiber separated a distance from the second optical fiber;

a detector communicably coupled to an output of the interferometer; and a computing system including an optical analysis processing circuit, the optical analysis processing circuit including a processor and memory, the memory being structured to store instructions that, when executed by the processor, cause the processor to:

generate a control signal for the light source to project a beam through the interferometer to produce a measurement beam directed through the first optical fiber and a reference beam;

sweep the beam from the light source across a plurality of wavelengths;

receive, from the detector, a beat signal corresponding to the reference beam and an interference beam from the second optical fiber of the DUT;

perform a fast Fourier transform (FFT) within segmented windows of the beat signal to generate an output signal for determining one or more characteristics of the DUT; and a switching system including a plurality of switches arranged between the interferometer and the first and second optical fibers of the DUT, wherein the instructions cause the processor to generate one or more control signals for switching between generation of the output signal for determining the one or more characteristics of the DUT, optical fiber alignment for the first optical fiber, and optical fiber alignment for the second optical fiber.

9. The system of claim 8, wherein a range of the segmented windows corresponds to a resolution of the plurality of wavelengths.

10. The system of claim 8, wherein the DUT is a wide dynamic range photonic device, the beat signal is a first beat signal received from the detector at a first detection level, and wherein the instructions further cause the processor to:

sweep the beam across the plurality of wavelengths;

receive, from the detector at a second detection level, a second beat signal corresponding to the beam swept across the plurality of wavelengths; and perform a FFT within segmented windows of the second beat signal.

11. The system of claim 10, wherein the instructions further cause the processor to:

stitch together a first signal corresponding to the FFT within the segmented windows of the first beat signal and a second signal corresponding to the FFT within the segmented windows of the second beat signal to generate the output signal for determining one or more characteristics of the wide dynamic range photonic device.

12. The system of claim 8, wherein the interferometer is a first interferometer, and wherein the light source is configured to project the beam through the first interferometer and through a second interferometer, the second interferometer configured to generate a sinusoidal signal corresponding to the beam from the light source.

13. The system of claim 12, wherein the instructions cause the processor to:

rescale the beat signal in frequency space using the sinusoidal signal from the second interferometer, wherein performing the FFT is performed responsive to rescaling the beat signal.

14. A method comprising:

generating a control signal for a light source to project a beam through an interferometer to produce a measurement beam directed through a first optical fiber corresponding to an input of a device under testing (DUT) and a reference beam, the first optical fiber separated a distance from the input;

sweeping the beam from the light source across a plurality of wavelengths;

receiving, from a detector communicably coupled to the interferometer, a beat signal corresponding to the reference beam and an interference beam from a second optical fiber corresponding to an output of the DUT;

performing a fast Fourier transform (FFT) within segmented windows of the beat signal to generate an output signal for determining one or more characteristics of the DUT; and generating one or more control signals for a switching system including a plurality of switches arranged between the interferometer and the first and second optical fibers of the DUT, the one or more control signals causing the switching system to switch between generation of the output signal for determining the one or more characteristics of the DUT, optical fiber alignment for the first optical fiber, and optical fiber alignment for the second optical fiber.

15. The method of claim 14, wherein a range of the segmented windows corresponds to a resolution of the plurality of wavelengths.

16. The method of claim 14, wherein the DUT is a wide dynamic range photonic device, the beat signal is a first beat signal received from the detector at a first detection level, and wherein the method further includes:

sweeping the beam across the plurality of wavelengths;

receiving, from the detector at a second detection level, a second beat signal corresponding to the beam swept across the plurality of wavelengths; and performing a FFT within segmented windows of the second beat signal.

17. The method of claim 14, further comprising stitching together a first signal corresponding to the FFT within the segmented windows of the first beat signal and a second signal corresponding to the FFT within the segmented windows of the second beat signal to generate the output signal for determining one or more characteristics of the wide dynamic range photonic device.

18. The method of claim 14, wherein the interferometer is a first interferometer, and wherein the light source projects the beam through the first interferometer and through a second interferometer, the second interferometer configured to generate a sinusoidal signal corresponding to the beam from the light source, the method further comprising:

rescaling the beat signal in frequency space using the sinusoidal signal from the second interferometer, wherein performing the FFT is performed responsive to rescaling the beat signal.

* * * * *